United States Patent
Wright et al.

(10) Patent No.: US 6,727,908 B1
(45) Date of Patent: Apr. 27, 2004

(54) NON-LINEAR INTERPOLATION SCALING SYSTEM FOR A GRAPHICS PROCESSING SYSTEM AND METHOD FOR USE THEREOF

(75) Inventors: Burton Wright, Sunnyvale, CA (US); Lesley Borbely-Bartis, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 349 days.

(21) Appl. No.: 09/655,516

(22) Filed: Aug. 31, 2000

(51) Int. Cl.[7] .............................................. G06T 11/00
(52) U.S. Cl. ...................................... 345/606; 345/589
(58) Field of Search ................................. 345/606, 589

(56) References Cited

U.S. PATENT DOCUMENTS

| | | | | |
|---|---|---|---|---|
| 5,420,979 A | | 5/1995 | Madden et al. ............. | 395/162 |
| 5,748,195 A | * | 5/1998 | Nin ............................. | 345/604 |
| 5,835,099 A | * | 11/1998 | Marimont .................... | 345/591 |
| 5,850,471 A | | 12/1998 | Brett .......................... | 382/162 |
| 5,896,122 A | | 4/1999 | MacDonald et al. ........ | 345/153 |
| 6,002,795 A | | 12/1999 | Eames et al. ............... | 382/167 |
| 6,137,494 A | * | 10/2000 | Nin ............................. | 345/593 |
| 6,157,749 A | | 12/2000 | Miyake ....................... | 382/300 |
| 6,157,937 A | * | 12/2000 | Wakasugi .................... | 708/290 |
| 6,259,427 B1 | * | 7/2001 | Martin et al. ............... | 345/698 |
| 6,313,840 B1 | * | 11/2001 | Bilodeau et al. ............ | 345/423 |
| 6,476,810 B1 | | 11/2002 | Simha et al. ................ | 345/424 |

OTHER PUBLICATIONS

Foley, Computer Graphics: Principles and Practice, 1996, pp. 132–140 and 619–623.*

* cited by examiner

*Primary Examiner*—Michael Razavi
*Assistant Examiner*—Motilewa Good-Johnson
(74) *Attorney, Agent, or Firm*—Dorsey & Whitney LLP

(57) ABSTRACT

A method and system for calculating an interpolated color value for a destination pixel from color values of source pixels adjacent to the destination pixel, where calculation of the color value of the destination pixel uses one of a plurality of interpolation functions selected according to the location of the destination pixel relative to one of the adjacent source pixels. Selection of the particular interpolation may be accomplished by defining a corresponding plurality of regions within the area covered by the adjacent source pixels and assigning an interpolation function to each of the regions. The region in which the destination pixel is located is identified, and the interpolation function assigned to the identified region is applied in the destination pixel color value calculation.

32 Claims, 6 Drawing Sheets

NON-LINEAR INTERPOLATION SCALING SYSTEM FOR A GRAPHICS PROCESSING SYSTEM AND METHOD FOR USE THEREOF

TECHNICAL FIELD

The present invention is related generally to the field of computer graphics, and more particularly, to calculating color values during a scaling operation in a computer graphics processing system.

BACKGROUND OF THE INVENTION

In the area of computer graphics, scaling graphics images is an important function that is used in a variety of applications. When enlarging images, various methods and systems have been used to calculate color values for the destination pixels of the scaled image in order for the scaled image to retain acceptable detail. A conventional method for generating destination pixel colors for the scaled image from source pixel colors of the original image is to use bilinear interpolation. As is well known in the art, bilinear interpolation applies a linear function in calculating a weighting value for each color of four adjacent source pixels $P_{s0}$–$P_{s3}$ based on the "location" of the destination pixel $P_d$ relative to the four source pixels. The location of the destination pixel is usually provided as fractional coordinates rU and rV, which indicate the relative position of the destination pixel $P_d$ with respect to the source pixel $P_{s0}$. The resulting destination pixel color is the sum of the color values of the four source pixels, weighted by the appropriate weighting value. Bilinear interpolation is frequently used because circuits that implement such a function are relatively inexpensive and well understood. Another conventional system uses a bicubic interpolation function. Although such a scaling system is more costly, the resulting color values calculated for the destination pixels produce a more realistic scaled image.

Although the conventional interpolation methods applied during scaling operations provide scaled images having reasonably acceptable resolution, there are several disadvantages to conventional scaling systems. For example, although circuits that implement a bilinear interpolation function for scaling operations are well known in the art, and are relatively inexpensive, the resulting scaled image may appear blurry or fuzzy because of the color averaging resulting from the bilinear interpolation function. The color averaging is in part due to the fact that a bilinear interpolation function is not ideally suited for scaling operations. The bilinear interpolation function begins weighting the color values immediately starting from one edge of a source pixel to the opposite edge, regardless of the scaling factor. As a result, the color values for the destination pixels appear averaged.

With respect to systems implementing bicubic interpolation, such systems are typically complicated and costly. Moreover, although a scaled image produced using a bicubic interpolation function has a better appearance than an image scaled using a bilinear interpolation function, bicubic interpolation may cause "ringing" artifacts in the scaled image, especially near sharp edges in the source content, such as with dark colored text against a light colored background.

Therefore, there is a need for a system and method for calculating the color values of destination pixels in a scaled graphics image which applies an interpolation function that accounts for the amount by which the image is scaled.

SUMMARY OF THE INVENTION

The present invention is directed to a method and system for calculating an interpolated color value for a destination pixel from color values of source pixels adjacent to the destination pixel, where calculation of the color value of the destination pixel uses one of a plurality of interpolation functions selected according to the location of the destination pixel relative to one of the adjacent source pixels. In one aspect of the invention, selection of the particular interpolation may be accomplished by defining a corresponding plurality of regions within the area covered by the adjacent source pixels and assigning an interpolation function to each of the regions. The region in which the destination pixel is located is identified, and the interpolation function assigned to the identified region is applied in the destination pixel color value calculation. In another aspect of the invention, the resultant values of the identified interpolation function are provided to a conventional bilinear interpolation circuit, and the color value of the destination pixel is calculated therefrom.

DETAILED DESCRIPTION OF THE INVENTION

Embodiments of the present invention apply a non-linear interpolation function that is a function of the scaling factor for scaling operations, particularly where the scaling operation is enlarging the graphics image. The resultant values of the non-linear interpolation function are provided to a conventional bilinear interpolation circuit for calculating the color value of destination pixels. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
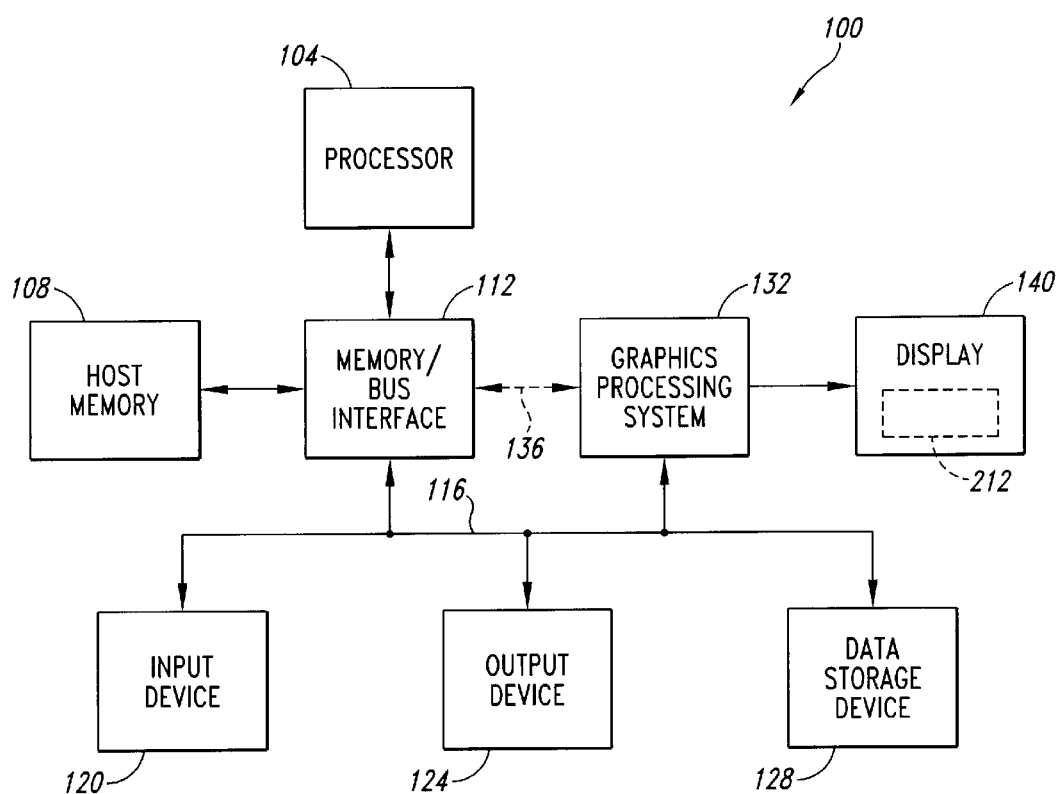
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications. As will be explained in more detail below, a scaling circuit 212 may be included in the display 140 to perform scaling operations on graphics images prior to rendering.

Figure 2:
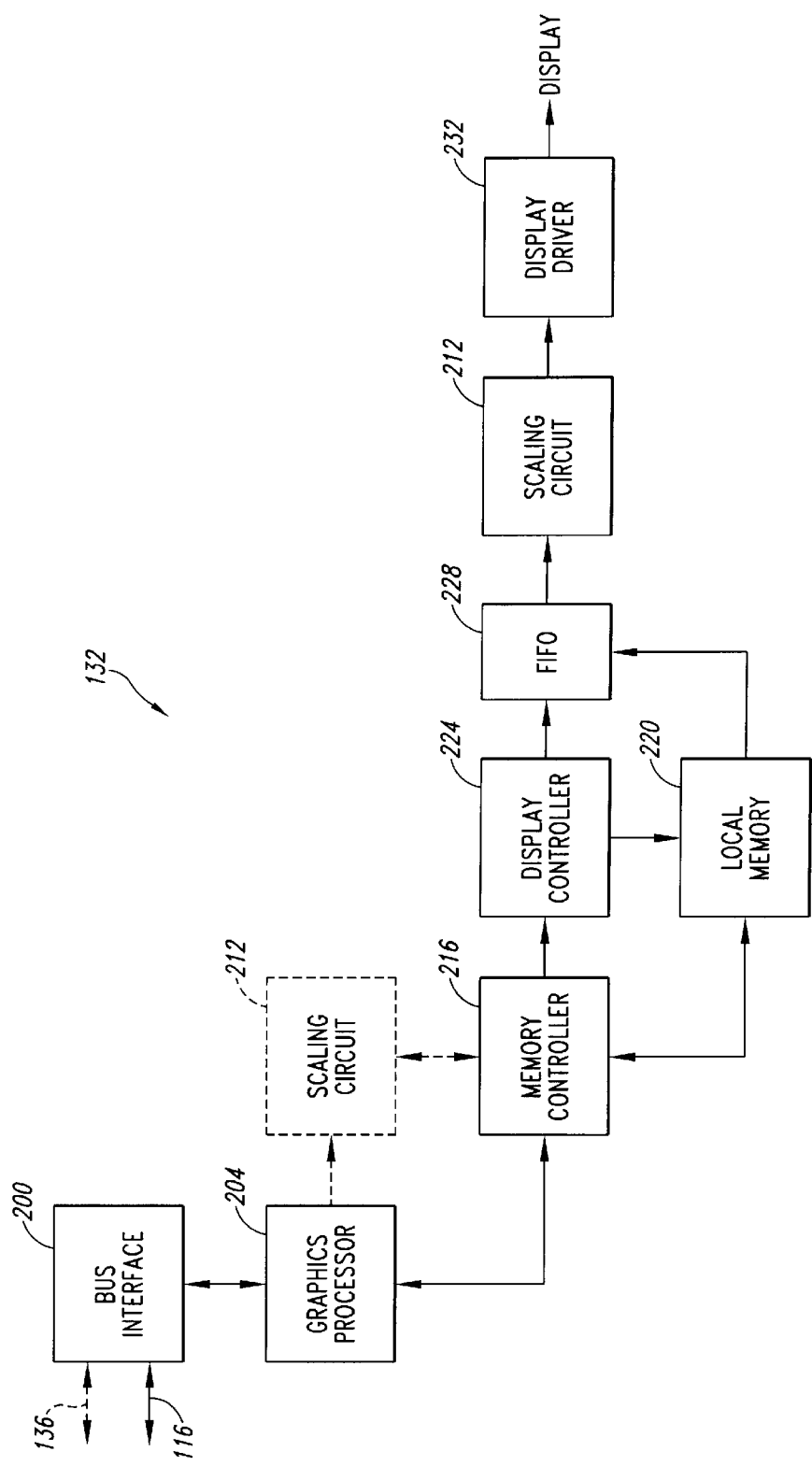
FIG. 2 is a block diagram of a graphics processing system in the computer system of FIG. 1.

FIG. 2 illustrates circuitry included within the graphics processing system 132 for performing various graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions. A memory controller 216 coupled to the graphics processor 204 handles memory requests to and from a local memory 220. The local memory 220 stores graphics data, such as source pixel color values and destination pixel color values. A display controller 224 coupled to the local memory 220 and to a first-in first-out (FIFO) buffer 228 controls the transfer of destination color values to the FIFO 228. Destination color values stored in the FIFO 336 are provided to a scaling circuit 212 that facilitates resizing or rescaling graphics images. As will be explained below, the scaling circuit 212 may be programmed so that the transformations performed during a scaling operation of graphics images are adaptable. A display driver 232 coupled to the output of the scaling circuit 212 includes circuitry to provide digital color signals, or convert digital color signals to red, green, and blue analog color signals, to drive the display 140 (FIG. 1).

Although the scaling circuit 212 is illustrated in FIG. 2 as being a separate circuit, it will be appreciated that the scaling circuit may be included in one of the aforementioned circuit blocks of the graphics processing system 132. For example, the scaling circuit 212 may be included in the graphics processor 204 or the display controller 224. In other embodiments, the scaling circuit 212 may be included in the display 140 (FIG. 1) coupled to a dedicated FIFO and processor (not shown). It will be further appreciated that the scaling circuit 212 may be relocated in FIG. 2 to an alternative location, such as coupled between the graphics processor 204 and the memory controller 216 without losing any functionality. Therefore, the particular location of the scaling circuit 212 is a detail that may be modified without deviating from the subject matter of the invention, and should not be used in limiting the scope of the present invention.

In scaling a graphics image, a ratio may be calculated that represents the relative size of the pixels of the source image and the pixels of the destination image. For example, if the source image is displayed at a resolution of $S_w \times S_h$ and the destination image is displayed at a resolution of $D_w \times D_h$, the relative size of the source pixels to the destination pixels is:

$$p_u = S_w/D_w \text{ and } p_v = S_h/D_h.$$

Figure 3A:
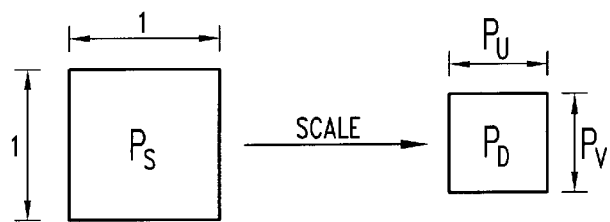
FIGS. 3a and b are illustrations of a source pixel and a scaled destination pixel, and an original image and a scaled image displayed on a display device.

The ratios $p_u$ and $p_v$ represent the relative "size" of the destination pixels compared to the source pixel along a horizontal axis u and a vertical axis v, respectively. As illustrated in FIG. 3a, if the source pixel $P_s$ is assumed to have a unit length of one for both its width and height (i.e., the pixel $P_s$ is a square), the destination pixel $P_d$ will have a width equal to $p_u$ and a height equal to $p_v$. From this analysis, it can be seen that each destination pixel $P_d$ in the scaled image represents "less" information than each pixel $P_s$ in the source image where the image is enlarged. The ratios $p_u$ and $p_v$ represent the relative size of the destination pixel $P_d$ and the source pixel $P_s$.

Figure 3B:
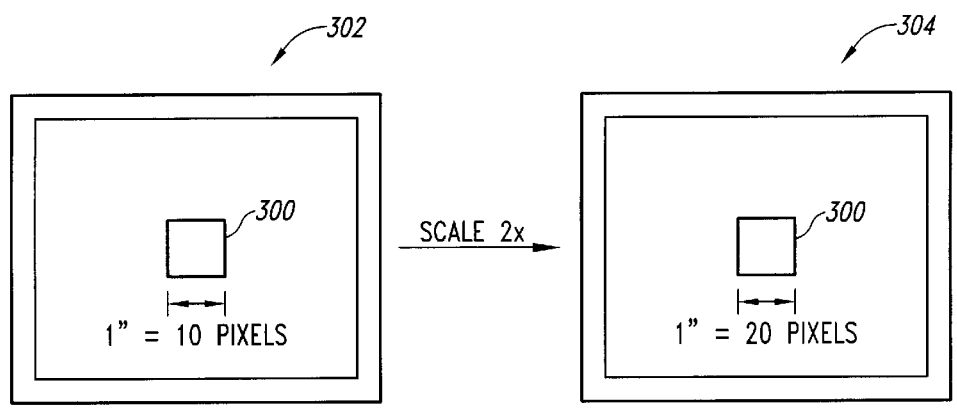

Another way to describe the reduction in content of each destination pixel is described with respect to FIG. 3b. An original image 302 and an enlarged image 304 of a one inch square 300 is displayed. If the square 300 is enlarged, the image size increases, however, the square is still one inch per side. What has occurred is that the number of pixels representing the image has increased. Assuming that in the original image 302 one inch is represented by 10 pixels, doubling the image size (i.e., enlarging by 100%) doubles the number of pixels to 20 pixels per side in the enlarged image 304. Consequently, each destination pixel $P_d$ in the enlarged image 304 represents half as much as each source pixel $P_s$ did in the original image 302.

Despite the fact that the relative size of the destination pixel $P_d$ changes in a scaling operation, in bilinear interpolation it is assumed that the source pixel $P_s$ and destination pixels $P_d$ are the same size, and as a result, the destination pixel $P_d$ will necessarily overlap at least two of the four adjacent source pixels $P_s$. Otherwise, the destination pixel $P_d$ would fall squarely on a source pixel $P_s$, and determining the color value would not require interpolation. However, this assumption ignores the fact that each destination pixel $P_d$ of the enlarged image is relatively smaller (or conveys less information) than a source pixel $P_s$ in the original image, and as a result, fails to account for the scaling factor in calculating the color values of the destination pixels $P_d$.

Figure 4A:
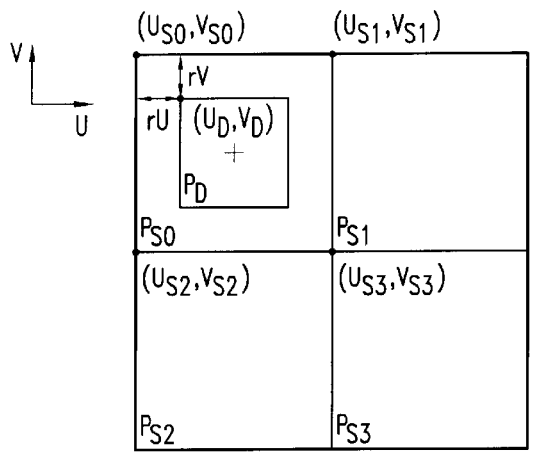
FIGS. 4a–c are illustrations of three domains for an area covered by adjacent source pixels according to an embodiment of the present invention.
Figure 4B:
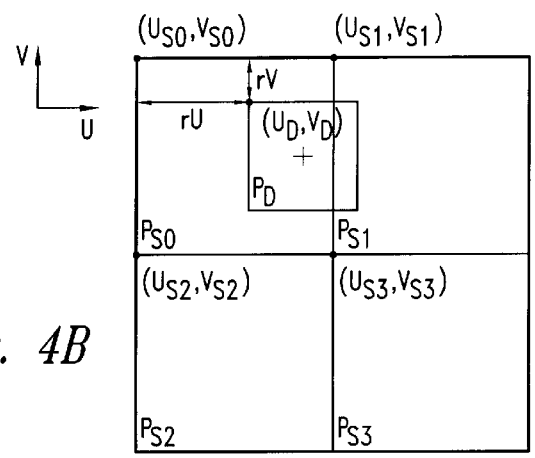
Figure 4C:
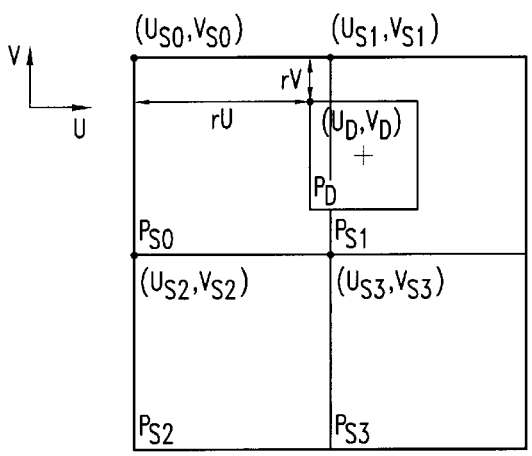

In embodiments of the present invention, the fact that a destination pixel $P_d$ is smaller than a source pixel $P_s$ for enlarging operations is accommodated in the color value calculation by applying a non-linear interpolation function that is a function of the scaling factor for enlarging operations. As mentioned previously, a destination pixel $P_d$ represents relatively less information than a source pixel $P_s$, or conceptually, is smaller than the source pixel $P_s$. A result of this fact is that the position of a destination pixel $P_d$ within four adjacent source pixels $P_{s0}$–$P_{s3}$ can be conceptually separated into three different domains: (1) the destination pixel $P_d$ is located entirely within a source pixel $P_{s0}$; (2) the center of a destination pixel $P_d$ is located within a source pixel $P_{s0}$, but at least a portion of the destination pixel is overlapping a different source pixel $P_{s1}$–$P_{s3}$ (i.e., edge overlap); or (3) the center of the destination pixel is located within a different source pixel $P_{s1}$–$P_{s3}$ (i.e., center overlap). The three domains are illustrated in FIGS. 4a–c, respectively. If the upper left corner of the source pixels $P_{s0}$–$P_{s3}$ and the destination pixel $P_d$ is used to identify the location of a pixel in a two-axes (u, v) coordinate system, the fractional coordinates (rU, rV) will represent the distance between the upper left corner of the source pixel $P_{s0}$ and the upper left corner of the destination pixel $P_d$. More specifically, rU is the horizontal distance of the left edge of the destination pixel $P_d$ from the left edge of the source pixel $P_{s0}$, and rV is the vertical distance of the upper edge of the destination pixel $P_d$ from the upper edge of the source pixel $P_{s0}$.

As discussed previously, the first domain is where the destination pixel $P_d$ is located entirely within the source pixel $P_{s0}$, the second domain is the edge overlap condition, and the third domain is the center overlap condition. These domains may be defined in terms of the $p_u$ and $p_v$ values previously described. In the following description of the domain definitions, discussion regarding the vertical axis v, has been omitted. The relative position of the destination pixel $P_d$ is described with respect to source pixels $P_{s0}$–$P_{s1}$. However, it will be appreciated that the domain definitions are symmetrical for the horizontal and vertical axes, u and v, respectively. Consequently, the following description for the domain definitions along the horizontal axis may be applied for the vertical axis as well.

The first domain is defined as the range:

$$0 \leq rU < (1-p_u).$$

That is, if $rU \leq (1-p_u)$, the destination pixel $P_d$ will be (ignoring position along the vertical axis v) entirely within the source pixel $P_{s0}$. The second domain is defined as the range:

$$(1-p_u) \leq rU < (1-p_u/2).$$

The upper bound of the second domain may be thought of as the boundary between the source pixels $P_{s0}$ and $P_{s1}$. The center of the destination pixel will be positioned on the boundary between source pixels $P_{s0}$ and $P_{s1}$ when $rU=(1-p_u/2)$. If rU is less than $(1-p_u/2)$, the center of the destination pixel $P_d$ remains in the source pixel $P_{s0}$, but a portion overlaps the source pixel $P_{s1}$. The third domain is defined as the range:

$$(1-p_u/2) \leq rU < 1.$$

In this domain, the center of the destination pixel $P_d$ is located within the source pixel $P_{s1}$, but has a portion that overlaps the source pixel $P_{s0}$. For each of the domains defined above, a different interpolation function may be applied. Thus, each of the functions can be tailored to create an overall non-linear interpolation function having desired interpolation characteristics during a scaling operation. The resulting non-linear interpolation function is defined as:

$$f(rU) = \begin{cases} f_0(rU) & \text{if } rU \in [0, 1-p_u) \\ f_1(rU) & \text{if } rU \in \left[1-p_u, 1-\frac{p_u}{2}\right) \\ f_2(rU) & \text{if } rU \in \left[1-\frac{p_u}{2}, 1\right) \end{cases},$$

where $f_0(rU)$ represents the interpolation function applied in the destination pixel's color value calculation for the first domain, $f_1(rU)$ represents the interpolation function applied for the second domain, and $f_2(rU)$ represents the interpolation function applied for the third domain.

As mentioned previously, the description of the different domains along the horizontal axis u may be similarly used to describe the different domains along the vertical axis v. Each domain may also have a different interpolation function such that the resulting non-linear interpolation function may be defined as:

$$g(rV) = \begin{cases} g_0(rV) & \text{if } rV \in [0, 1-p_v) \\ g_1(rV) & \text{if } rV \in \left[1-p_v, 1-\frac{p_v}{2}\right) \\ g_2(rV) & \text{if } rV \in \left[1-\frac{p_v}{2}, 1\right) \end{cases},$$

where $g_0(rV)$ represents the interpolation function applied for the first domain, $g_1(rV)$ represents the interpolation function applied for the second domain, and $g_2(rV)$ represents the interpolation function applied for the third domain. As with the interpolation function along the horizontal axis, each function can be tailored to create a resulting non-linear interpolation function having the interpolation characteristics desired during a scaling operation.

Figure 5:
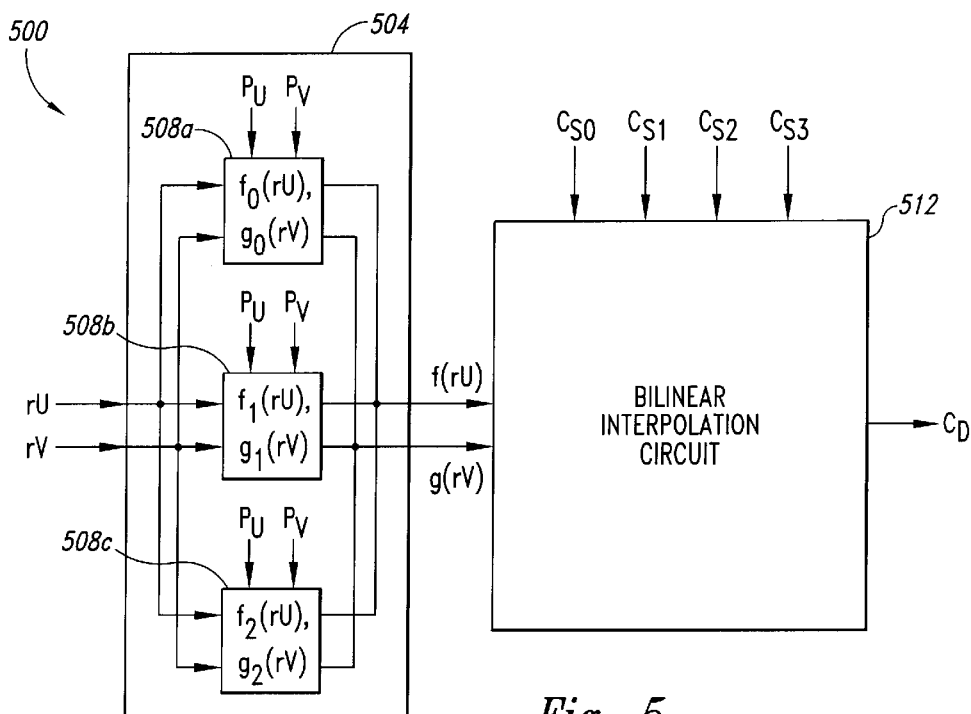
FIG. 5 is a block diagram of an interpolation circuit according to an embodiment of the present invention.

FIG. 5 illustrates a scaling circuit 500 that may be used to implement a different interpolation function for each of the domains. The scaling circuit 500 includes a programmable processor 504 that is capable of performing three different interpolation functions for each domain of both u and v axes. Programmable interpolation circuits 508a–c receive the fractional coordinates rU and rV of the destination pixel $P_d$ and determine whether to perform the programmed interpolation function. Ratios $p_u$ and $p_v$ are provided to each of the programmable interpolation circuits 508a–c in order for each circuit to identify whether the fractional coordinates are within the respective domains. As illustrated, programmable interpolation circuit 508a performs the interpolation functions $f_0(rU)$ and $g_0(rV)$ for rU and rV values within the first domain; programmable interpolation circuit 508b performs the interpolation functions $f_1(rU)$ and $g_1(rV)$ for rU and rV values within the second domain; and programmable interpolation circuit 508c performs the interpolation functions $f_2(rU)$ and $g_2(rV)$ for rU and rV values within the third domain.

The resultant output f(rU) and g(rV) of the programmable interpolation circuits 508a–c is provided to a conventional bilinear interpolation circuit 512. The bilinear interpolation circuit 512 also receives the color values $C_{s0}$–$C_{s3}$ of the four source pixels $P_{s0}$–$P_{s3}$ adjacent to the destination pixel $P_d$ based on its fractional coordinates rU and rV. It will be appreciated by those of ordinary skill in the art that the color of the destination pixel $P_d$ and the color of the four adjacent source pixels $C_{s0}$–$C_{s3}$ typically consist of several color components. For example, the destination pixel color value $C_d$ and the source pixel colors $C_{s0}$–$C_{s3}$ may be the combination of red, green, and blue color components. Consequently, as it is well known in the art that the bilinear interpolation circuit 512 includes circuitry to perform bilinear interpolation for each of the color components although the circuitry is not shown in FIG. 5. As is well known in the art, the bilinear interpolation circuit 512 calculates the color value $C_d$ of the destination pixel $P_d$ from the following equation:

$$C_d = \text{Weight}_0 \cdot C_{s0} + \text{Weight}_1 \cdot C_{s1} + \text{Weight}_2 \cdot C_{s2} + \text{Weight}_3 \cdot C_{s3}.$$

where $$\text{Weight}_0 = (1-rU) \cdot (1-rV), \text{Weight}_1 = (rU) \cdot (1-rV),$$

$$\text{Weight}_2 = (1-rU) \cdot (rV), \text{ and } \text{Weight}_3 = (rU) \cdot (rV).$$

With the input to the bilinear interpolation circuit 512 being f(rU) and g(rV), the weighting values are:

$$\text{Weight}_0 = (1-f(rU)) \cdot (1-g(rV)), \text{Weight}_1 = f(rU) \cdot (1-g(rV)),$$

$$\text{Weight}_2 = (1-f(rU)) \cdot g(rV), \text{ and } \text{Weight}_3 = f(rU) \cdot g(rV).$$

As mentioned previously, each function can be tailored to create a resulting non-linear interpolation function having the interpolation characteristics desired during a scaling operation.

In an embodiment of the present invention, the non-linear interpolation function applied for the first domain, that is, where the destination pixel $P_d$ is located entirely within a source pixel $P_{s0}$, ignores the color values of the other three adjacent source pixels $P_{s1}$–$P_{s3}$, and calculates the color value of the destination pixel $P_d$ based solely on the color value of the source pixel in which it is located. However, in the second and third domains, that is, where a portion of the destination pixel $P_d$ overlaps at least another one of the other three adjacent source pixels $P_{s0}$–$P_{s3}$, a linear interpolation function is applied to determine the weighting values for the color of the source pixels $P_{s0}$–$P_{s3}$ according to the relative position of the destinations pixel $P_d$. The non-linear interpolation function is defined as:

$$f(rU) = \begin{cases} 0 & \text{if } rU \in [0, 1-p_u) \\ \frac{1}{p_u} \cdot (rU + p_u - 1) & \text{if } rU \in \left[1-p_u, 1-\frac{p_u}{2}\right) \\ \frac{1}{p_u} \cdot (rU + p_u - 1) & \text{if } rU \in \left[1-\frac{p_u}{2}, 1\right) \end{cases}, \text{ and}$$

$$g(rV) = \begin{cases} 0 & \text{if } rV \in [0, 1-p_v) \\ \frac{1}{p_v} \cdot (rV + p_v - 1) & \text{if } rV \in \left[1-p_v, 1-\frac{p_v}{2}\right) \\ \frac{1}{p_v} \cdot (rV + p_v - 1) & \text{if } rV \in \left[1-\frac{p_v}{2}, 1\right) \end{cases}$$

where f(rU) is the non-linear interpolation function along the horizontal axis, g(rV) is the non-linear interpolation function along the vertical axis, and $p_u$ and $p_v$ represent the relative size of the destination pixel $P_d$ and source pixels $P_s$ along the horizontal and vertical axes, respectively.

Figure 6:
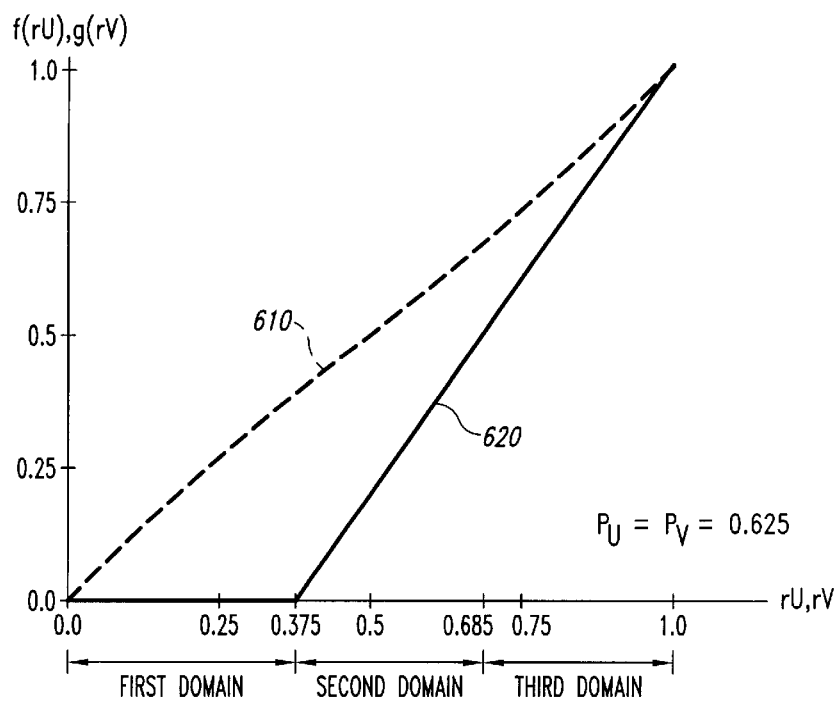
FIG. 6 is an illustration of a interpolation function according to an embodiment of the present invention.

FIG. 6 illustrates a conventional linear interpolation function 610 and non-linear interpolation function 620 representative of the previously described function for a scaling operation that enlarges a source image having a 640×480 pixel resolution to a destination image having a 1024×768 pixel resolution. The relative size of the destination pixels to the source pixels along each axis is:

$$p_u = 1024/640 = 0.625, \text{ and}$$

$$p_v = 768/480 = 0.625.$$

As illustrated in FIG. 6, the contribution to the color value of the destination pixel Pd by the source pixels $P_{s1}$–$P_{s3}$ for fractional coordinates rU or rV less than 0.375 (i.e., rU and rV in the first domain) is kept to zero. The color value of the destination pixel $P_d$ is based solely on the color value of the source pixel $P_{s0}$ when the fractional coordinates are within the first domain. As the fractional coordinates exceed 0.325 (i.e., rU and rV are in the second or third domain), a linear interpolation function is used to determine the weighting values for calculating the color value of the destination pixel $P_d$.

Figure 7:
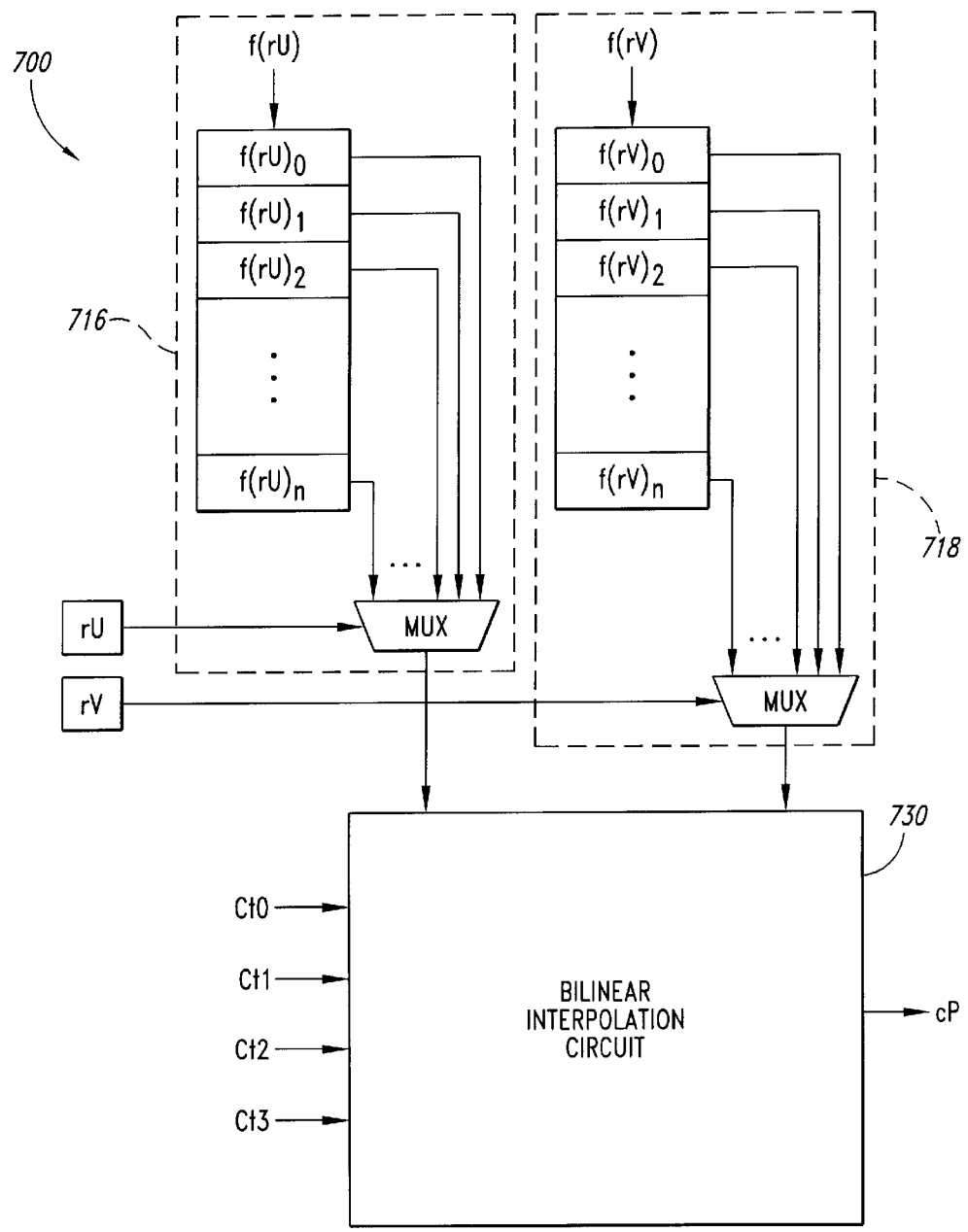
FIG. 7 is a block diagram of an interpolation circuit according to another embodiment of the present invention.

FIG. 7 illustrates an adaptive scaling circuit 700 that may be alternatively used to implement embodiments of the present invention. The scaling circuit 700 is described in co-pending U.S. patent application Ser. No. 09/607,757 to Wright et al., entitled APPARATUS AND METHOD FOR ADAPTIVE TRANSFORMATION OF FRACTIONAL PIXEL COORDINATES FOR CALCULATING COLOR VALUES, filed on Jun. 29, 2000, which is incorporated herein by reference. The adaptive scaling circuit 700 includes two multiplexed look-up tables (LUTs) 716 and 718 coupled to a conventional bilinear interpolation circuit 730. Each LUT 716 and 718 stores values $f(rU)_0$–$f(rU)_n$ and $f(rV)_0$–$f(rV)_n$ that are resultants of a respective interpolation function which is associated with each axis. The fractional coordinates rU and rV of the destination pixel $P_d$ are used as indices to select values stored in the respective LUTs 716 and 718 to be provided to the bilinear interpolation circuit 730. The values provided by the LUTs 716 and 718 are used by the bilinear interpolation circuit 730 to calculate weighting values for the color value calculation of the destination pixel $P_d$. Use of the LUTs 716 and 718 takes advantage of the well known conventional bilinear interpolation circuit 730, and enables the resulting scaling circuit 700 to perform various interpolation functions. A more detailed explanation of the scaling circuit 700 is provided in the previously referenced patent application.

As applied to embodiments of the present invention, the LUTs 716 and 718 of the scaling circuit 700 may be programmed to store the resultant values of the non-linear interpolation functions f(rU) and g(rV) described previously. That is, for a scaling operation, the appropriate resultant values are programmed into the LUTs 716 and 718 that represent the respective interpolation function applied for each of the domains. New resultant values may need to be programmed into the LUTs 716 and 718 for each scaling operation since the domains are defined as a function of the scaling ratio. The interpolation function applied for a domain may be a function of the scaling ratio as well.

Although the examples provided herein have assumed that scaling along the horizontal and vertical axes are symmetrical, and that the same non-linear interpolation function is applied along both axes, it will be appreciated that the scaling function along the horizontal axis may be different than that applied along the vertical, and that the scaling ratio for each axis may be different. Moreover, it will be appreciated that although embodiments of the present invention have discussed three different domains, more or less domains may be defined without exceeding the scope of the present invention.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for calculating a color value for a destination pixel from color values of adjacent source pixels arranged in a two axes coordinate system and covering an area, the method comprising:

defining first, second, and third domains for the area covered by the adjacent source pixels, each domain having an interpolation function associated therewith, the first, second, and third domains defined as:

$0 \leq rU < (1-p_u)$, $(1-p_u) \leq rU < (1-p_u/2)$, and $(1-p_u/2) \leq rU < 1$, respectively, where rU represents the fractional coordinate of the destination pixel along a first axis relative to the one source pixel, and $p_u$ represents the relative size of the source pixel to the destination pixel;

based on the location of the destination pixel relative to one of the plurality of source pixels, identifying the domain in which the destination pixel is located; and calculating a color value for the destination pixel using the interpolation function associated with the identified domain.

2. The method of claim 1 wherein the interpolation function associated with the first, second, and third domains are:

0, $(1/p_u) \cdot (rU+p_u-1)$, and $(1/p_u) \cdot (rU+p_u-1)$, respectively, where rU represents the location of the destination pixel relative to one of the adjacent source pixels, and $p_u$ represents the relative size of the source pixel to the destination pixel.

3. The method of claim 1 wherein the interpolation function associated with the first, second, and third domains are each different.

4. The method of claim 1 wherein defining the plurality of domains comprises defining a plurality of domains along first and second axes of the coordinate system.

5. The method of claim 4 wherein defining the plurality of domains along the second axis comprises defining first, second, and third domains.

6. The method of claim 5, wherein the first, second, and third domains are defined as:

$0 \leq rV < (1-p_v)$, $(1-p_v) \leq rV < (1-p_v/2)$, and $(1-p_v/2) \leq rV < 1$, respectively, where rV represents the fractional coordinate of the destination pixel along the second first axis relative to the one source pixel, and $p_v$ represents the relative size of the source pixel to the destination pixel along the second axis.

7. The method of claim 6 wherein the interpolation function associated with the first, second, and third domains are:

0, $(1/p_v) \cdot (rV+p_v-1)$, and $(1/p_v) \cdot (rV+p_v-1)$, respectively, where rV represents the location of the destination pixel relative to one of the adjacent source pixels along the second coordinate axis, and $p_v$ represents the relative size of the source pixel to the destination pixel along the second coordinate axis.

8. The method of claim 1 wherein calculating a color value comprises:

providing a resultant value from the associated interpolation function to a bilinear interpolation circuit; and bilinearly interpolating a color value for the destination pixel based on the resultant value.

9. A method for calculating an interpolated color value for a destination pixel from color values of source pixels adjacent to the destination pixel, comprising calculating the color value of the destination pixel using one of a plurality of interpolation functions selected according to the location of the destination pixel relative to one of the adjacent source pixels, and defining for an area covered by the adjacent source pixels into first, second, and third regions, the first, second, and third regions defined as:

$0 \leq rU < (1-p_u)$, $(1-p_u) \leq rU < (1-p/2)$, and $(1-p_u/2) \leq rU < 1$, respectively, where rU represents the fractional coordinate of the destination pixel along a first axis relative to a source pixel, and $p_u$ represents the relative size of one source pixel to the destination pixel along the first axis.

10. The method of claim 9 wherein the interpolation function associated with the first, second, and third regions are:

0, $(1/p_u) \cdot (rU+p_u-1)$, and $(1/p_u) \cdot (rU+p_u-1)$, respectively, where rU represents the location of the destination pixel relative to one of the adjacent source pixels along a first axis, and $p_u$ represents the relative size of the source pixel to the destination pixel along the first axis.

11. The method of claim 9 wherein defining the plurality of regions comprises defining a plurality of regions along a first and second coordinate axes.

12. The method of claim 9 wherein calculating a color value comprises:

providing a resultant value from the associated interpolation function to a bilinear interpolation circuit; and bilinearly interpolating a color value for the destination pixel based on the resultant value.

13. A method for calculating a color value for a destination pixel from color values of a plurality of pixels adjacent to the location of the destination pixel, comprising:

defining in the adjacent pixels first, second, and third regions, each region assigned an interpolation function, and wherein selecting one of the plurality of interpolation functions comprises determining which of the regions the destination pixel is located and selecting the interpolation function assigned thereto, the first, second, and third regions defined as:

$0 \leq rU < (1-p_u)$, $(1-p_u) \leq rU < (1-p_u/2)$, and $(1-p_u/2) \leq rU < 1$, respectively, where rU represents the fractional coordinate of the destination pixel along a first axis relative to the one source pixel, and $p_u$ represents the relative size of the source pixel to the destination pixel along the first axis;

selecting one of a plurality of interpolation functions based on the location of the destination pixel relative to the first second, and third regions; and applying the selected interpolation function in calculating the color value of the destination pixel.

14. The method of claim 13 wherein the plurality of interpolation functions comprises first, second, and third functions, defined as follows:

0, $(1/p_u) \cdot (rU + p_u - 1)$, and $(1/p_u) \cdot (rU + p_u - 1)$, respectively, where rU represents the location of the destination pixel relative to one of the adjacent source pixels along a first axis, and $p_u$ represents the relative size of the source pixel to the destination pixel along the first axis.

15. The method of claim 13 wherein selecting an interpolation function and applying the selected interpolation function is performed along both a first and a second axes of a two axes coordinate system.

16. The method of claim 15 wherein the interpolation functions along the second axis comprise:

0, $(1/p_v) \cdot (rV + p_v - 1)$, and $(1/p_v) \cdot (rV + p_v - 1)$, respectively, where rV represents the location of the destination pixel relative to one of the adjacent source pixels along the second coordinate axis, and $p_v$ represents the relative size of the source pixel to the destination pixel along the second coordinate axis.

17. A color value interpolation circuit for calculating a color value for a destination pixel from color values of source pixels adjacent to the destination pixel's location, the interpolation circuit comprising a programmable register to store values representative of resultant values of first, second, and third interpolations functions, each of which is associated with one of a corresponding plurality of domains into which an area covered by the adjacent source pixels is divided, the first, second, and third interpolation functions defined as:

0, $(1/p_u) \cdot (rU + p_u - 1)$, and $(1/p_u) \cdot (rU + p_u - 1)$, respectively where rU represents the location of the destination pixel relative to one of the adjacent source pixels along a first axis, and $p_u$ represents the relative size of the source pixel to the destination pixel along the first axis.

18. The interpolation circuit of claim 17 wherein the plurality of domains comprise first, second, and third domains.

19. The interpolation circuit of claim 18 wherein the first, second, and third domains are defined as:

$0 \leq rU < (1-p)$, $(1-p_u) \leq rU < (1-p_u/2)$, and $(1-p_u/2) \leq rU < 1$, respectively, where rU represents the fractional coordinate of the destination pixel along a first axis relative to one of the plurality of source pixels, and $p_u$ represents the relative size of the source pixels to the destination pixel along the first axis.

20. The interpolation circuit of claim 17 wherein the programmable register stores values along a first axis and the interpolation circuit further including a second programmable register to store values representative of resultant values of a plurality of interpolation functions for a second axis.

21. The interpolation circuit of claim 20 wherein the plurality of interpolation functions for a second axis comprise first, second, and third interpolation functions.

22. The interpolation circuit of claim 21 wherein the first, second, and third interpolation functions comprise:

0, $(1/p_v) \cdot (rV + p_v - 1)$, and $(1/p_v) \cdot (rV + p_v - 1)$, respectively, where rV represents the location of the destination pixel relative to one of the adjacent source pixels along the second axis, and $p_v$ represents the relative size of the source pixel to the destination pixel along the second axis.

23. The interpolation circuit of claim 20 wherein the plurality of domains comprise first, second, and third domains.

24. The interpolation circuit of claim 23 wherein the first, second, and third domains are defined as:

$0 \leq rV < (1-p_v)$, $(1-p_v) \leq rV < (1-p_v/2)$, and $(1-p_v/2) \leq rV < 1$, respectively, where rV represents the fractional coordinate of the destination pixel along the second axis relative to one of the plurality of source pixels, and $p_v$ represents the relative size of the source pixels to the destination pixel along the second axis.

25. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a color value interpolation circuit coupled to the graphics processor and the display logic to calculate a color value for a destination pixel from color values of source pixels adjacent to the destination pixel's location, the interpolation circuit comprising a programmable register to store values representative of resultant values of a plurality of interpolations functions, each of which is associated with a corresponding one of first, second, and third domains into which an area covered by the adjacent source pixels is divided, the first, second, and third domains defined as:

$0 \leq rU < (1-p_u)$, $(1-p_u) \leq rU < (1-p_u/2)$ and $(1-p_u/2) \leq rU < 1$, respectively, where rU represents the fractional coordinate of the destination pixel along a first axis relative to one of the plurality of source pixels, and $p_u$ represents the relative size of the source pixels to the destination pixel along the first axis.

26. The graphics processing system of claim 25 wherein the plurality of interpolation functions comprises first, second, and third interpolation functions.

27. The graphics processing system of claim 26 wherein the first, second, and third interpolation functions comprise:

0, $(1/p_u) \cdot (rU+p_u-1)$, and $(1/p_u) \cdot (rU+p_u-1)$, respectively, where rU represents the location of the destination pixel relative to one of the adjacent source pixels along a first axis, and $p_u$ represents the relative size of the source pixel to the destination pixel along the first axis.

28. The graphics processing system of claim 25 wherein the programmable register stores values along a first axis and the interpolation circuit further including a second programmable register to store values representative of resultant values of a plurality of interpolation functions for a second axis.

29. The graphics processing system of claim 28 wherein the plurality of interpolation functions for a second axis comprise first, second, and third interpolation functions.

30. The graphics processing system of claim 29 wherein the first, second, and third interpolation functions comprise:

0, $(1/p_v) \cdot (rV+p_v-1)$, and $(1/p_v) \cdot (rV+p_v-1)$, respectively, where rV represents the location of the destination pixel relative to one of the adjacent source pixels along the second axis, and $p_v$ represents the relative size of the source pixel to the destination pixel along the second axis.

31. The graphics processing system of claim 28 wherein the plurality of domains comprise first, second, and third domains.

32. The graphics processing system of claim 31 wherein the first, second, and third domains are defined as:

$0 \leq rV < (1-p_v)$, $(1-p_v) \leq rV < (1-p_v/2)$, and $(1-p_v/2) \leq rV < 1$, respectively, where rV represents the fractional coordinate of the destination pixel along the second axis relative to one of the plurality of source pixels, and $p_v$ represents the relative size of the source pixels to the destination pixel along the second axis.

* * * * *